Oct. 9, 1956
E. S. TUPPER
2,765,832
MIXING BOWL
Filed May 17, 1954
2 Sheets-Sheet 1
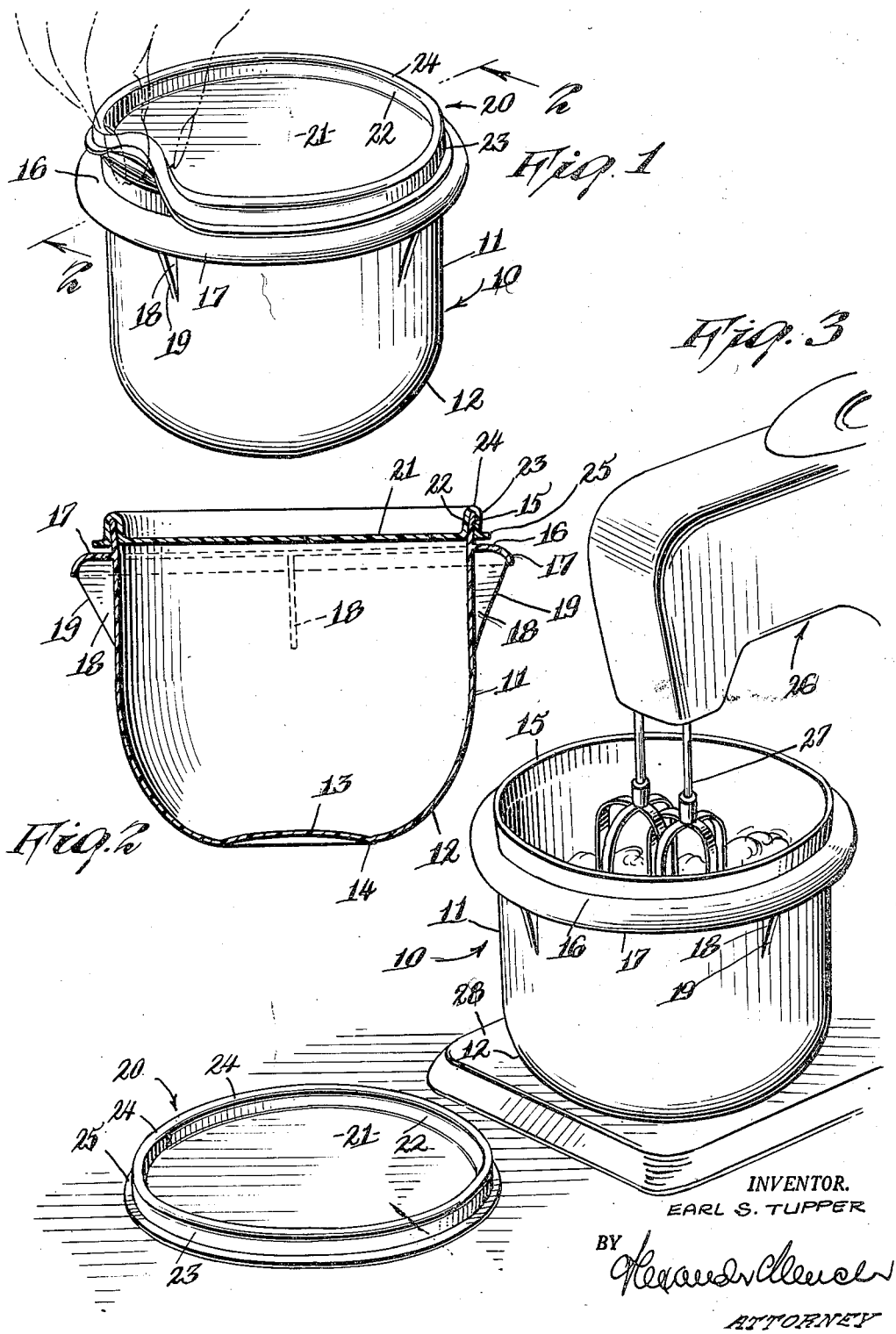
INVENTOR.
EARL S. TUPPER
BY
ATTORNEY Oct. 9, 1956   E. S. TUPPER   2,765,832
MIXING BOWL
Filed May 17, 1954   2 Sheets-Sheet 2
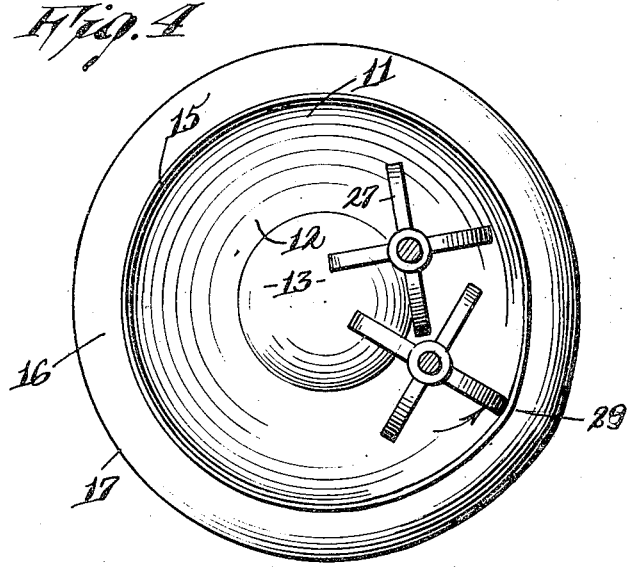
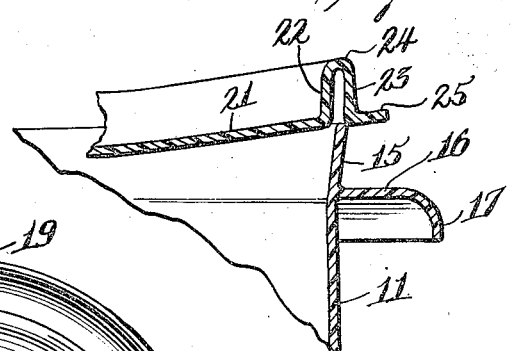
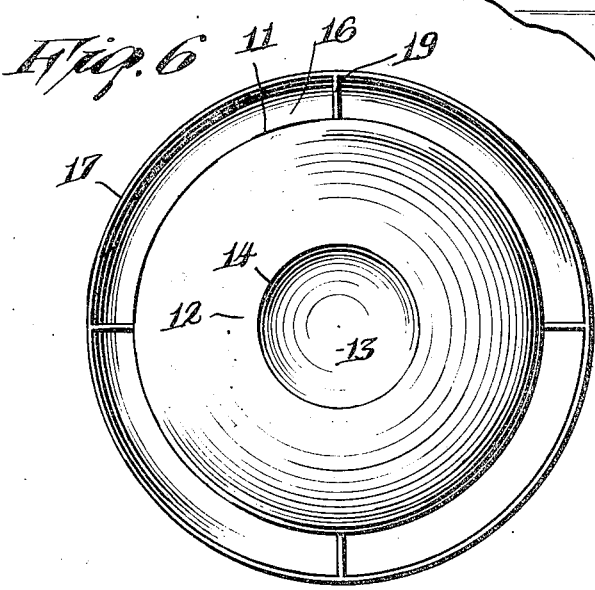
EARL S. TUPPER
INVENTOR.
BY
ATTORNEY United States Patent Office 2,765,832
Patented Oct. 9, 1956

2,765,832

MIXING BOWL

Earl S. Tupper, Upton, Mass.

Application May 17, 1954, Serial No. 430,144

3 Claims. (Cl. 150—.5)

This invention relates to a combination mixing bowl and canister, but more specifically to a substantially rigid mixing bowl which is capable of use in connection with electrical mixers and hand devices and beaters but which at the same time is resiliently yieldable to shock of impact and prolonged local pressures whereby neither the electrical apparatus, hand devices nor the bowl is adversely affected.

A feature of the invention resides in the provision of a combined mixing bowl and canister with and without a cover and which is substantially rigid, cannot crack and pulverize and which at the same time is formed of resilient and locally distortable material whereby not only the bowl but also the mechanical instruments are prevented from injury, cessation of operation and contamination of the bowl contents.

A further feature of the invention resides in the provision of a combination canister and mixing bowl formed of resilient and locally distortable material such as polyethylene wherein distortion of shape is limited and prevented by reason of the provision of a flange member adjacent the bowl rim and radially supported at the underside of the flange and by reason of the substantially cylindrical shape of the vessel side walls adjacent the bottom curved side wall areas.

A further feature of the invention resides in the provision of a combination canister and mixing bowl which is substantially shape-retaining, which absorbs sound, which is sanitary, which affords a sterile medium, which is washable at working temperatures, which is substantially inert to and resistant to chemicals and which at the same time is locally distortable as to yield at points of sustained or sudden pressure and impact and resilient at such points when the said external forces are removed.

Part of the structure herein, namely, the cover member and its engagement with the rim of the bowl is shown in U. S. Patent No. 2,487,400 granted to the applicant on November 8, 1949, and part of the structure is further shown in applicant's pending application filed December 23, 1952 under Serial No. 327,476.

These objects and other incidental ends and advantages of the invention will hereinafter appear in the progress of the disclosure and as pointed out in the appended claims.

Accompanying this specification are drawings showing a preferred form of the invention wherein:

Figure 1 is a view in perspective of the mixing bowl and cover with the latter disengaged at an initial disengaging position.

Figure 2 is a sectional view of Figure 1 across the plane 2—2 thereof with the cover in full engagement.

Figure 3 is a view in perspective of the bowl and cover removed therefrom with the bowl serving as a mixing bowl in conjunction with electrically driven equipment.

Figure 4 is a top plan view of the bowl having electrical mixing equipment therein shown partly in section, and indicating the local yieldability of a portion of the side wall when the moving or rotary equipment accidentally reaches beyond the full diameter of the bowl wall.

Figure 5 is an enlarged sectional and fragmentary view showing the cover member free of the bowl at a specific area.

Figure 6 is a bottom plan view of the bowl.

In accordance with the invention and the preferred form shown, the vessel generally indicated by numeral 10, is substantially in the form of a cylindrical section, the side walls of which are indicated by numeral 11.

This cylindrical section adjacent the bottom portion is inwardly curved as at 12 and joins with a concentric and bottom member 13 of relatively small diameter. As shown, the junction between curved wall portion 12 and bottom wall 13 is in the form of a reinforcing bead member 14 and the bottom wall 13 is concave in shape.

The mouth of bowl 10 is provided with a rim 15, outwardly flared as shown, said rim being integral with and forming a continuation of the upper part of the cylindrical wall 11. Below and adjacent rim 13 is a continuous or peripheral, outwardly extending rim reinforcing element such as flange 16 terminating in its outer free edge in an outwardly and downwardly curved portion 17. Supporting the underside of flange 16 are a plurality of spaced and radially disposed reinforcing tabs or depending web members each designated by numeral 18, the inner edge of each of said tabs being integral with or secured to the outer face of the cylindrical side wall 11, while the opposite free edge 19, as shown, tapers inwardly and downwardly from the outer and free edge of flange portion 17. The upper edge of tab 18 is integral with the lower surface of flange and flange portions 16 and 17. The bottom bowl wall 13 in addition to being provided with the reinforcing bead 14 at its periphery, as has been mentioned, is substantially insulated from a supporting surface by reason of the concavity of said bottom wall.

The bowl or vessel 10 is preferably formed of polyethylene or other material having similar physical characteristics. It has many functions: as a storing vessel engageable with a hermetically sealable cover generally indicated by numeral 20; as a mixing vessel for hand or electrically driven equipment when the cover is disengaged; and a dispensing bowl with or without the cover.

A closure member or cover 20, if desired, may be formed of polyethylene or other material having similar physical characteristics. The cover is provided with a central wall 21 which is provided at the edge thereof with a raised grooved rim having an inner wall 22, a spaced outer wall 23 and a top joining wall 24, the outer wall 23 having an outwardly extending flange 25 all described in U. S. Patent No. 2,487,400 as aforementioned.

The groove defined by walls 22, 23 and 24 is adapted to engage the rim portion 15 of bowl or vessel 10 whereby a hermetical sealing engagement is effectuated in the same manner as set forth in the above patent.

It is to be observed that cover flange 25 and bowl or vessel flange 17 are suitably spaced when the parts are assembled so that a finger may be introduced therebetween for initiating removal of the cover as indicated in Figure 1 and as will hereinafter appear. Moreover, flange 16 and flange portion 17 extend beyond the terminal edge of cover flange 25 both for expediting introduction of said finger and for adding resistance against deformation and bending of the flange in all directions.

It is further to be noted that the inner dimension or diameter of outer wall 23 is smaller than the outer dimension of rim portion 15, and that the sealing points are at the upper portion of the inner side of wall 23 and at the lower side of connecting wall 24 with respect to the outer and top sides of rim portion 15. These sealing points obtain only when the outer dimension of inner wall 22 is less than the inner dimension of rim portion 15.

In order to remove the closure member from rim 15, the first step required is to introduce the thumb of one hand between closure flange 25 and vessel flange 16 and, if desired, using cover central wall 21 as a fulcrum by the rest of the hand. After a portion of the closure engaging groove is cleared from vessel rim 15, the cover is simply peeled off by the thumb and index finger in a progressive manner. The other hand may be used for grasping the vessel 10 or flange 16 or tab 18 to exert opposing pressure if said bowl has not sufficient weight to overbalance the upward force required to remove the cover.

Closure member 20 is applied to vessel 10 in a progressive manner by running the thumb along groove top wall 24 and the finger along the underside of vessel flange 16—17 at opposing pressures after a portion of the closure groove and the vessel rim are brought into engagement by the thumb and finger.

The vessel or bowl 10 is substantially rigid and reinforced against deformation and alteration of shape by sudden impact and application of sudden and sustained pressures by the effective reinforcing rings furnished by the vessel flange 16—17, the tabs 18, and the cylindrical section of the bowl side wall 11. The curved wall portion 12 is also significant in that it facilitates centrifugal movement of the contents of the bowl when the contents thereof are to be mixed by a rotary or mixing implement.

The bowl as described in both shape, structure and material lends itself to use as a mixing bowl for either hand or electrical equipment. As shown, an electrical mixer indicated generally by numeral 26 has a rotary beater 27 disposed within the bowl 10 for purposes of mixing materials therein, the bowl resting on the equipment base 28.

By virtue of the rigidity afforded bowl 10 by the shape of the vessel and by the utilization of flange 16—17, and tabs 18, the bowl is just as effective as a bowl made out of vitreous or metallic material, but with distinct advantages thereover. Thus, because the bowl is made of a resilient and locally distortable material such as polyethylene or other plastic material having similar characteristics, it is yieldable at points of pressure as shown in Figure 5. If by accident the beater 27 creeps or is extended beyond the inner diameter of side wall 11 neither the vessel nor the beater is injured nor is operation suspended for the reason that the wall in this region, as indicated at numeral 29, yields thereby permitting the beater to continue rotating without adverse effect on itself or on the bowl. When the bowl is again centered and this will take place automatically by continuous running, neither the beater nor the bowl is adversely affected in respect to slight pulverization thereof with the result that the bowl contents do not become contaminated. In addition, the material of the bowl is an absorber of sound and lends to quiet operation.

As mentioned, closure member 20 may be made of polyethylene or other material having similar physical characteristics. But the vessel operates as a mixing bowl independent of the cover, and if desired, the latter may be made of a more rigid material such as polystyrene or other less resilient material.

The spaced tab members 18 as shown are in diametric relationship, but they may be applied at any spaced points along the side of vessel 10, and in addition to serving as handles for canister and vessel use, they also serve to reinforce the vessel flange 16—17 as has been mentioned.

It is to be noted that the effect of the use of polyethylene or other material having similar physical characteristics for both the vessel 10 and the closure 20 is to give the joint between rim 15 and cover walls 22, 23 and 24 a mutually live resistance.

Vessel 10 may be molded by compression, injection or in any other manner and the vessel is particularly suitable for mixing and storage purposes since polyethylene is chemically inert, light in weight, unbreakable, odorless, unaffected by working temperatures, sterile and consequently resistant to mildews, micro-organisms and insects, washable and pleasant to the touch.

The mixing bowl above described has many applications for domestic, commercial and scientific uses. Thus, in the home it may be used with hand and electrically driven equipment for kitchen and culinary purposes. Commercially, it can be used for centrifuging or forming intimate mixtures. In research it also has application because of the inert nature of the material, sound absorption, nonbreakability and local and resilient deformability.

The mixing bowl flange 16 is significant for purposes of serving as a handle for transporting and also for gripping and holding the device when used for mixing.

Thus, when mixing the contents of bowl 10 for domestic purposes with a hand spoon or electric mixer when the combined weight is light, flange portions 16 and 17 together with or without tab members 18 are grasped by the finger tips with an edge of the thumb resting against the external surface of rim 15 so that the fingers are not exposed to injury by the mixing elements. Such gripping maintains the bowl in stable position. Moreover, for this purpose, the rim 15 is made more rigid by flange 16, and the latter itself is reinforced against bending in all directions by flange portion 17 and tab members 18.

I wish it understood that minor changes and variations in the location, integration, material, size and shape of parts may all be resorted to without departing from the spirit of the invention and the scope of the appended claims.

I claim:

1. A shape-retaining mixing bowl for food and the like, comprising an open-mouthed and substantially cylindrical vessel, said vessel being inwardly curved adjacent the bottom whereby contents of the bowl are capable of being mixed, stirred and centrifuged by hand and power driven implements, the vessel below the mouth rim having an outwardly extending peripheral flange terminating in a downwardly curved edge portion, spaced and radially disposed reinforcing elements secured to and between the underside of said flange and the outer face of said vessel, said vessel, flange and reinforcing elements being formed of resilient and deformable polyethylene or other substance having similar physical properties, said vessel being resistant to general shape distortion by means of the said substantially cylindrical vessel, the said flange and said reinforcing elements.

2. A mixing bowl for food and the like, comprising a relatively deep and an open-mouthed, hollow body member having a side wall consisting of a cylindrically shaped portion below the mouth rim and an inwardly directed spherically shaped portion continuous therewith, and having an integral bottom and concentric bowl-supporting wall terminating said spherically shaped portion whereby the contents of the bowl are capable of being centrifuged by hand and power-driven implements, and an integral and annular flange on the cylindrically shaped portion of the outer face of the side wall adjacent and below the mouth rim, spaced supporting members secured to and between the underside of the flange and the outer face of the side wall, the said bowl and annular flange and supporting members being formed of a non-breakable, non-porous, resilient and locally deformable polyethylene material and the said bowl being resistant to general shape distortion by means of the said cylindrically shaped side wall portion and the flange and supporting members.

3. A mixing bowl comprising a relatively deep and an open-mouthed and substantially cylindrical vessel having a mouth rim, said vessel being inwardly curved adjacent the bottom whereby contents of the bowl are capable of being mixed, stirred and centrifuged by hand and power driven implements, a peripheral and outwardly extending flange disposed below and adjacent said rim and having spaced reinforcing members secured to and between the underside of said flange and the outer face of the vessel wall, said vessel, flange and reinforcing members being formed of a resilient and locally deformable plastic material, the vessel being resistant to shape distortion thereby, said rim and flange also serving as gripping and carrying means for the vessel.

References Cited in the file of this patent

UNITED STATES PATENTS

| | | |
|---|---|---|
| 1,394,540 | Diack | Oct. 25, 1921 |
| 1,972,895 | Maccoy | Sept. 11, 1934 |
| 2,223,695 | Mayfield | Dec. 3, 1940 |
| 2,289,913 | Joor | July 14, 1942 |
| 2,487,400 | Tupper | Nov. 8, 1949 |
| 2,614,727 | Robinson | Oct. 21, 1952 |
| 2,675,040 | Raun et al. | Apr. 13, 1954 |
| 2,695,645 | Tupper | Nov. 30, 1954 |
| 2,711,766 | Archer | June 28, 1955 |
| 2,726,517 | Pruett | Dec. 13, 1955 |